United States Patent
Masaki et al.

(10) Patent No.: US 6,638,486 B2
(45) Date of Patent: Oct. 28, 2003

(54) CATALYST FOR PURIFICATION OF EXHAUST GASES, PRODUCTION PROCESS THEREFOR, AND PROCESS FOR PURIFICATION OF EXHAUST GASES

(75) Inventors: Shinyuki Masaki, Himeji (JP); Ryoji Kuma, Himeji (JP); Noboru Sugishima, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 228 days.

(21) Appl. No.: 09/799,433

(22) Filed: Mar. 5, 2001

(65) Prior Publication Data

US 2001/0031700 A1 Oct. 18, 2001

(30) Foreign Application Priority Data

Mar. 8, 2000 (JP) ......................................... 2000-063864

(51) Int. Cl.$^7$ .............................. B01J 8/02; B01J 23/00; C01B 21/04
(52) U.S. Cl. ............................... 423/213.2; 423/239.1; 423/240 R; 502/308; 502/309; 502/311; 502/312; 502/349; 502/353
(58) Field of Search .............................. 423/235, 239.1, 423/240 R, 213.2; 502/308, 309, 311, 312, 349, 353

(56) References Cited

U.S. PATENT DOCUMENTS

| | | | |
|---|---|---|---|
| 4,085,193 A | 4/1978 | Nakajima et al. | 423/239 |
| 4,221,768 A | 9/1980 | Inoue et al. | 423/239 |
| 4,466,947 A * | 8/1984 | Imanari et al. | 423/239 |
| 5,227,356 A | 7/1993 | Hess et al. | 502/217 |
| 5,276,250 A | 1/1994 | Hagenmaier et al. | 588/123 |
| 5,430,230 A | 7/1995 | Mitsui et al. | 588/206 |
| 5,512,259 A | 4/1996 | Hagenmaier et al. | 423/239.1 |
| 5,527,755 A * | 6/1996 | Wenski et al. | 502/325 |
| 5,658,546 A * | 8/1997 | Kobayashi et al. | 423/239.1 |
| 5,866,499 A | 2/1999 | Hums et al. | 502/321 |
| 5,877,391 A * | 3/1999 | Kanno et al. | 588/205 |

FOREIGN PATENT DOCUMENTS

| | | |
|---|---|---|
| GB | 2 149 680 A | 6/1985 |
| JP | 53-28148 B | 8/1978 |
| JP | 57-30532 B2 | 6/1982 |
| JP | 6-38863 B2 | 5/1994 |
| JP | 2916259 B2 | 4/1999 |
| JP | 11-188260 A | 7/1999 |
| JP | 2000-42409 A | 2/2000 |
| JP | 2000-61305 A | 2/2000 |
| JP | 2000-93750 A | 4/2000 |
| WO | WO 92/19366 A1 | 11/1992 |

* cited by examiner

*Primary Examiner*—Stanley S. Silverman
*Assistant Examiner*—Jonas N. Strickland
(74) *Attorney, Agent, or Firm*—Haugen Law Firm PLLP

(57) ABSTRACT

The present invention provides: a catalyst for purification of exhaust gases which catalyst is excellent as a denitrification catalyst which has still more excellent ability to remove nitrogen oxides and of which the ability to oxidize sulfur dioxide into sulfur trioxide is extremely suppressed and further as a catalyst which is favorable for efficiently removing organohalogen compounds, such as dioxins, from exhaust gases; a production process therefor; and a process for purification of exhaust gases. The catalyst for purification of exhaust gases comprises titanium oxide, molybdenum oxide, and vanadium oxide as catalytic components, wherein the titanium oxide and the molybdenum oxide are included in the catalyst in the form of: a binary closely mixed oxide which is beforehand prepared and includes titanium and molybdenum; and/or a trinary closely mixed oxide which is beforehand prepared and includes titanium, silicon, and molybdenum.

7 Claims, 3 Drawing Sheets

US 6,638,486 B2

CATALYST FOR PURIFICATION OF EXHAUST GASES, PRODUCTION PROCESS THEREFOR, AND PROCESS FOR PURIFICATION OF EXHAUST GASES

BACKGROUND OF THE INVENTION

A. Technical Field

The present invention relates to a catalyst for purification of exhaust gases, a production process therefor, and a process for purification of exhaust gases. Particularly, the invention relates to: a catalyst for purification of exhaust gases which catalyst is excellent as a denitrification catalyst for removing nitrogen oxides ($NO_x$) from exhaust gases and as a catalyst for removing poisonous organohalogen compounds, such as dioxins, from exhaust gases; a production process therefor; and a process for purification of exhaust gases.

B. Background Art

A selective catalytic reduction process that is called SCR process is conventional as a process that is practically used at present for removing nitrogen oxides from exhaust gases wherein the selective catalytic reduction process comprises the steps of: catalytically reducing the nitrogen oxides (which are contained in the exhaust gases) on a denitrification catalyst with reducing agents such as ammonia and urea; and thereby decomposing the nitrogen oxides into harmless nitrogen and water. In recent years, as environmental pollution due to nitrogen oxides (typified by acid rain) assumes worldwide serious proportions, efficiency enhancement in denitrification arts is demanded more and more.

In such circumstances, a denitrification catalyst comprising oxides of titanium and vanadium and oxides of such as molybdenum and tungsten (JP-B-028148/1978) and a denitrification catalyst comprising a titanium-silicon-binary oxide and oxides of metals such as vanadium, tungsten, and molybdenum (JP-B-030532/1982) were put to practical use and are widely used at present.

All these catalysts have excellent ability to remove nitrogen oxides and low ability to oxidize sulfur oxides coexisting in exhaust gases, and further have excellent durability. However, it is favorable that catalysts which exhibit still higher performance emerge.

In addition, exhaust gases from incineration facilities for purification of industrial wastes and city wastes contain trace amounts of poisonous organohalogen compounds such as dioxins, PCB and chlorophenols. Particularly, the dioxins are so extremely poisonous as to have a serious influence on human bodies even if the quantities of the dioxins are very small. Therefore, a technology for removing the dioxins is desired to be developed as quickly as possible. A catalytic decomposition process is one of the most effective technologies and generally involves the use of catalysts comprising oxides of such as titanium, vanadium, tungsten and molybdenum, but, according to conditions of the exhaust gases, the performances of these catalysts cannot be said to be enough, therefore more enhancement of the catalytic performances is desired.

SUMMARY OF THE INVENTION

A. Object of the Invention

An object of the present invention is to provide: a catalyst for purification of exhaust gases which catalyst is excellent as a denitrification catalyst which has still more excellent ability to remove nitrogen oxides and of which the ability to oxidize sulfur dioxide into sulfur trioxide is extremely suppressed and further as a catalyst which is favorable for efficiently removing organohalogen compounds, such as dioxins, from exhaust gases; a production process therefor; and a process for purification of exhaust gases.

B. Disclosure of the Invention

In order to solve the above-mentioned problems, a catalyst for purification of exhaust gases, according to the present invention, comprises titanium oxide, molybdenum oxide, and vanadium oxide as catalytic components, wherein the titanium oxide and the molybdenum oxide are included in the catalyst in the form of: a binary closely mixed oxide which is beforehand prepared and includes titanium and molybdenum; and/or a trinary closely mixed oxide which is beforehand prepared and includes titanium, silicon, and molybdenum.

A production process for a catalyst for purification of exhaust gases, according to the present invention, is a production process for a catalyst for purification of exhaust gases wherein the catalyst comprises titanium oxide, molybdenum oxide, and vanadium oxide as catalytic components, and this production process comprises the steps of: mixing a titanium-compound-containing aqueous solution or slurry with a molybdenum compound and, if necessary, a silicon compound; and then removing water.

These and other objects and the advantages of the present invention will be more fully apparent from the following detailed disclosure.

DETAILED DESCRIPTION OF THE INVENTION

Figure 1:
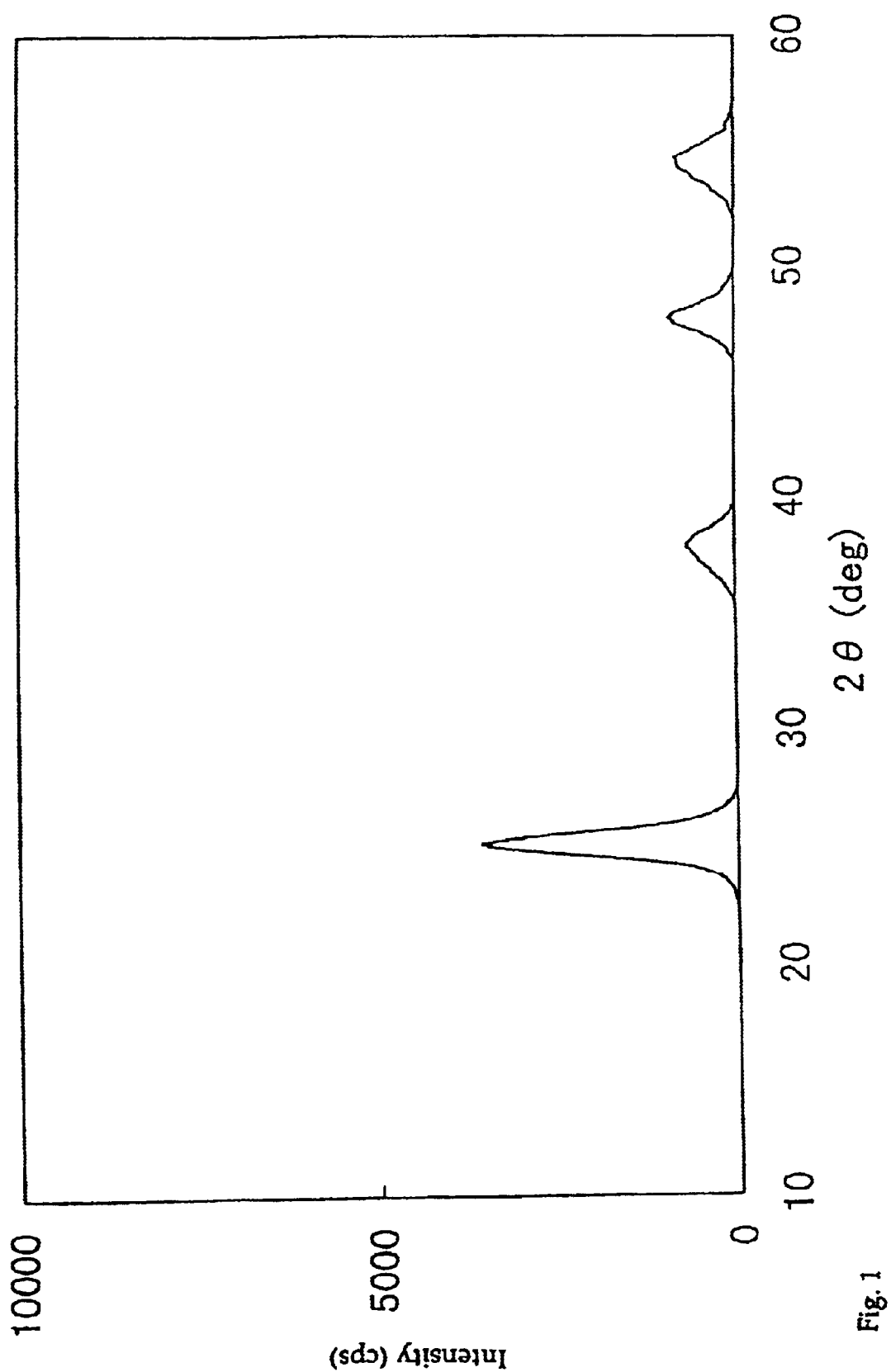
FIG. 1 is an X-ray diffraction chart of the catalyst (1) as prepared in Example 1.

The catalyst for purification of exhaust gases, according to the present invention, is a catalyst comprising titanium oxide, molybdenum oxide, and vanadium oxide. When the titanium oxide and the molybdenum oxide are included in the catalyst in the form of a binary closely mixed oxide which is beforehand prepared and includes titanium and molybdenum, the composition of the catalyst is such that: the titanium oxide content is preferably in the range of 55 to 99.4 weight %, more preferably 60 to 90 weight %, and the molybdenum oxide content is preferably in the range of 0.5 to 30 weight %, more preferably 1 to 25 weight %, and the vanadium oxide content is preferably in the range of 0.1 to 15 weight %, in weight ratio in terms of oxide of each element. In addition, when the titanium oxide and the molybdenum oxide are included in the catalyst in the form of a trinary closely mixed oxide which is beforehand prepared and includes titanium, silicon, and molybdenum, the composition of the catalyst is such that: the titanium oxide content is preferably in the range of 5 to 98.9 weight %, more preferably 10 to 90 weight %, and the silicon oxide content is preferably in the range of 0.5 to 50 weight %, more preferably 5 to 50 weight %, and the molybdenum oxide content is preferably in the range of 0.5 to 30 weight %, more preferably 1 to 25 weight %, and the vanadium oxide content is preferably in the range of 0.1 to 15 weight %, in weight ratio in terms of oxide of each element.

The catalyst for purification of exhaust gases, according to the present invention, involves the beforehand preparation and the use of: a binary closely mixed oxide which includes titanium and molybdenum (titanium-molybdenum-closely-mixed oxide); and/or a trinary closely mixed oxide which includes titanium, silicon, and molybdenum (titanium-silicon-molybdenum-closely-mixed oxide). The beforehand preparation of the titanium-molybdenum-closely-mixed oxide and/or the titanium-silicon-molybdenum-closely-mixed oxide enables to more closely disperse and mix titanium and molybdenum to thereby enhance the dispersibility of molybdenum, with the result that the interaction between titanium and molybdenum is strengthened, whereby high decomposition activity can be obtained. Accordingly, it is considered that when the catalyst is used as the denitrification catalyst, the ability to oxidize sulfur oxides is suppressed, while the denitrifiability is enhanced. In addition, it is considered that when the catalyst is used as the catalyst for removing organohalogen compounds, the catalyst can efficiently remove the organohalogen compounds, such as dioxins, from exhaust gases.

In the present invention, the "closely mixed oxide" means that which, in its X-ray diffraction chart, shows neither clear characteristic peak of $SiO_2$ nor $MoO_3$ and, as to $TiO_2$, does not show its characteristic peak or, if any, shows a diffraction peak broader than that of titanium oxide.

For the preparation of the present invention catalyst for purification of exhaust gases, it is favorable to produce this catalyst by the production process comprising the steps of: mixing a titanium-compound-containing aqueous solution or slurry with a molybdenum compound and, if necessary, a silicon compound; and then removing water. The titanium-molybdenum-closely-mixed oxide and/or the titanium-silicon-molybdenum-closely-mixed oxide can easily be obtained by adding the molybdenum compound and, if necessary, the silicon compound before removing water from the titanium-compound-containing aqueous solution or slurry (in other words, before formation of crystals of titanium oxide).

Specific examples of the preparation process are as follows:

Preparation process (1): A molybdenum compound, such as ammonium paramolybdate or molybdic acid, is dispersed into water, and then an aqueous ammonia solution is added. While the resultant aqueous molybdenum solution is stirred, thereto a liquid or aqueous solution of a water-soluble titanium compound such as titanium tetrachloride, titanium sulfate, or titanium tetraalkoxide is gradually dropwise added, thereby obtaining a slurry. This slurry is filtrated, and then washed, and then dried, and then calcined at high temperature, preferably in the range of 300 to 600° C., thus obtaining the titanium-molybdenum-closely-mixed oxide. In the case of the titanium-silicon-molybdenum-closely-mixed oxide, silica sol is beforehand added to the aqueous solution of molybdenum and ammonia.

Preparation process (2): Such as an aqueous ammonia solution or water is added to an aqueous solution of a water-soluble titanium compound in order to hydrolyze it, thus obtaining titanium hydroxide, to which an aqueous molybdenum solution is then added. While the resultant mixture is kneaded, water is evaporated therefrom to dryness, and then the resultant dry product is calcined at high temperature, preferably in the range of 300 to 600° C. In the case of the titanium-silicon-molybdenum-closely-mixed oxide, silica sol is added to the above titanium hydroxide simultaneously or in order with the addition of the above aqueous molybdenum solution to the above titanium hydroxide.

Preparation process (3): A molybdenum compound (and silica sol in the case of the titanium-silicon-molybdenum-closely-mixed oxide) is added to a metatitanic acid slurry. While the resultant mixture is kneaded, water is evaporated therefrom to dryness, and then the resultant dry product is calcined at high temperature, preferably in the range of 300 to 600° C.

Of the above preparation processes, the process (1) is more favorable.

Of the sources for the titanium-molybdenum-closely-mixed oxide or titanium-silicon-molybdenum-closely-mixed oxide, the titanium source is usable whether it is an inorganic or organic compound if it can form titanium oxide by calcination. Examples thereof include: inorganic titanium compounds such as titanium tetrachloride and titanium sulfate; and organic titanium compounds such as titanium oxalate and tetraisopropyl titanate. The silicon source may be used by fitly being selected from among: inorganic silicon compounds such as colloidal silica, water glass, finely particulate silicon, silicon tetrachloride, and silica gel; and organic silicon compounds such as tetraethyl silicate. In addition, as to the molybdenum source, either an inorganic or organic compound may be used if it can form molybdenum oxide by calcination. The molybdenum source may be used by fitly being selected from among such as oxides, hydroxides, ammonium salts, and halides, all of which contain molybdenum. Specific examples thereof include ammonium paramolybdate and molybdic acid.

The titanium-molybdenum-closely-mixed oxide and the titanium-silicon-molybdenum-closely-mixed oxide, as obtained in the above way, may be used either alone respectively or in combinations with each other, or in combinations with other oxides of titanium such as titanium oxide and titanium-silicon-closely-mixed oxide.

As to the raw material for providing the vanadium oxide, not only vanadium oxide itself, but also either an inorganic or organic compound may be used if it can form vanadium oxide by calcination. Usable examples thereof include hydroxides, ammonium salts, oxalate salts, halides, and sulfate salts, all of which contain vanadium.

The process for addition of the vanadium oxide is not especially limited, but examples thereof include a process which comprises the steps of: adding a vanadium-source-containing aqueous solution to a powder of the titanium-molybdenum-closely-mixed oxide and/or titanium-silicon-molybdenum-closely-mixed oxide (as obtained in the above preparation process) together with an organic or inorganic molding assistant which is conventionally used when carrying out this kind of molding; and then mixing and kneading them under heated conditions in order to evaporate water therefrom to make an extrudable paste; and then molding this paste into shapes of such as honeycombs with an extrusion molding machine; and then drying the resultant molded product; and then calcining the resultant dry product at high temperature under air atmosphere. In addition, another process can also be adopted which process comprises the steps of: beforehand molding the titanium-molybdenum-closely-mixed oxide and/or titanium-silicon-molybdenum-closely-mixed oxide (as obtained in the above preparation process) into shapes of such as spherical or columnar pellets and latticed honeycombs; and then calcining the resultant molded product; and then impregnating the resultant calcined product with a vanadium-source-containing aqueous solution to support this solution on the calcined product. In addition, the catalyst can be prepared by a process which comprises the step of kneading the powder of the titanium-molybdenum-closely-mixed oxide and/or titanium-silicon-molybdenum-closely-mixed oxide directly with a vanadium oxide powder.

The shape of the catalyst is not especially limited, but the catalyst can be used in the form molded into desired shapes of such as honeycombs, plates, nets, columns, and cylinders. In addition, the catalyst may be used in the form supported on a supporter which has a desired shape selected from among shapes of such as honeycombs, plates, nets, columns, and cylinders, and comprises such as alumina, silica, cordierite, mullite, SiC, titania, or stainless steel.

The catalyst for purification of exhaust gases, according to the present invention, can be used for purification of various exhaust gases. The composition of the exhaust gases is not especially limited, but the catalyst according to the present invention has so excellent decomposing activity upon nitrogen oxides as discharged from such as boilers, incinerators, gas turbines, diesel engines, and various industrial processes that this catalyst is favorably used for purification of exhaust gases containing these nitrogen oxides. Furthermore, these exhaust gases generally further contain sulfur dioxide and, in the case where this sulfur dioxide is oxidized into sulfur trioxide, there occur troubles such as corrosion of apparatuses. However, the catalyst according to the present invention has so low ability to oxidize sulfur dioxide into sulfur trioxide as to still more favorably be used.

To carry out denitrification with the catalyst according to the present invention, this catalyst is brought into contact with exhaust gases in the presence of reducing agents such as ammonia and urea to reduce nitrogen oxides as contained in the exhaust gases, thereby removing the nitrogen oxides from the exhaust gases. The conditions in this step are not especially limited, but this step can be carried out under conditions which are conventionally used for this kind of reaction. Specifically, the conditions may fitly be determined in consideration of such as the type and properties of the exhaust gases and the required nitrogen oxide decomposition ratio.

Incidentally, when the denitrification is carried out with the catalyst according to the present invention, the space velocity of the exhaust gases is usually in the range of 100 to 100,000 $Hr^{-1}$ (STP), preferably 200 to 50,000 $Hr^{-1}$ (STP). In the case where the space velocity is slower than 100 $Hr^{-1}$, the efficiency is bad in that too large a purification apparatus is needed. On the other hand, in the case where the space velocity is faster than 100,000 $Hr^{-1}$, the decomposition efficiency is low. In addition, the temperature during the denitrification is preferably in the range of 100 to 500° C., more preferably in the range of 150 to 400° C.

In addition, the catalyst according to the invention is favorably used also for purification of organohalogen-compound-containing exhaust gases from incineration facilities for purification of industrial wastes and city wastes.

To carry out purification of the organohalogen compounds with the catalyst according to the present invention, this catalyst is brought into contact with exhaust gases to decompose the organohalogen compounds as contained in the exhaust gases, thereby removing the organohalogen compounds from the exhaust gases. The conditions in this step are not especially limited, but this step can be carried out under conditions which are conventionally used for this kind of reaction. Specifically, the conditions may fitly be determined in consideration of such as the type and properties of the exhaust gases and the required organohalogen compound decomposition ratio. If reducing agents such as ammonia and urea are added, the denitrification can also be carried out simultaneously with the purification of the organohalogen compounds.

Incidentally, when the purification of the organohalogen compounds is carried out with the catalyst according to the present invention, the space velocity of the exhaust gases is usually in the range of 100 to 100,000 $Hr^{-1}$ (STP), preferably 200 to 50,000 $Hr^{-1}$ (STP). In the case where the space velocity is slower than 100 $Hr^{-1}$, the efficiency is bad in that too large a purification apparatus is needed. On the other hand, in the case where the space velocity is faster than 100,000 $Hr^{-1}$, the decomposition efficiency is low. In addition, the temperature during the purification of is preferably in the range of 130 to 500° C., more preferably in the range of 150 to 400° C.

(Effects and Advantages of the Invention):

The present invention enables to more closely disperse and mix titanium and molybdenum to thereby enhance the dispersibility of molybdenum, with the result that the interaction between titanium and molybdenum is strengthened, whereby high decomposition activity can be obtained.

Accordingly, when the catalyst is used as the denitrification catalyst, the ability to oxidize sulfur oxides is suppressed, while the denitrifiability is enhanced.

In addition, when the catalyst is used as the catalyst for removing organohalogen compounds, the catalyst can efficiently remove the organohalogen compounds, such as dioxins, from exhaust gases.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples of some preferred embodiments.

EXAMPLE 1

(Preparation of Titanium-Molybdenum-Closely-Mixed Oxide):

First, an titanium-molybdenum-closely-mixed oxide was prepared in the following way. An amount of 2.25 kg of a molybdic acid powder was added to a mixed solution comprising 121 kg of industrial ammonia water ($NH_3$ content=25 wt %) and 86 liters of water to entirely dissolve the molybdic acid by enough agitation to prepare a uniform solution, to which 257 liters of a sulfuric acid solution of titanyl sulfate (produced by TAYCA Co., Ltd.; $TiO_2$ content=70 g/liter; $H_2SO_4$ content=287 g/liter) was gradually dropwise added under agitation to form a precipitate. This coprecipitate slurry was left to stand stationary for about 20 hours, and then washed enough with water, and then filtrated, and then dried at 100° C. for 1 hour. The resultant dry product was calcined at 550° C. for 4 hours under air atmosphere, and then ground with a hammer mill, and then classified with a classifier to obtain a powder having an average particle diameter of 10 μm. The composition of the titanium-molybdenum-closely-mixed oxide, as prepared in this way, was $TiO_2:MoO_3$=90:10 (weight ratio in terms of oxide).

(Addition of Vanadium Oxide):

Next, 1.29 kg of ammonium metavanadate, 1.67 kg of oxalic acid and 0.4 kg of monoethanolamine were mixed and thereby dissolved into 8 liters of water to prepare a uniform solution. This vanadium-containing solution was added together with a molding assistant into a kneader in which 19 kg of the above-prepared titanium-molybdenum-closely-mixed oxide powder had been placed, and the resultant mixture was stirred enough. Furthermore, this mixture was well mixed with a blender while a proper quantity of water was added thereto. Thereafter, the resulting mixture was kneaded enough with a continuous kneader and then extrusion-molded into a honeycomb form having an external form size of 80 mm square, an opening size of 4 mm, a wall thickness of 1 mm and a length of 500 mm. Thereafter, the resultant form was dried at 60° C. for 1 hour and then calcined at 450° C. for 5 hours under air atmosphere to obtain an aimed catalyst (1), of which the composition was (titanium-molybdenum-closely-mixed oxide):$V_2O_5$=95:5 in weight ratio ($TiO_2$:$MoO_3$:$V_2O_5$=85.5:9.5:5 in weight ratio in terms of oxide).

An X-ray diffraction chart of the catalyst (1) is shown in FIG. 1, in which no clear characteristic peak of $MoO_3$ is seen, but broad diffraction peaks of $TiO_2$ are seen. From this result, it was verified that the catalyst (1) was a binary closely mixed oxide including titanium and molybdenum.

EXAMPLE 2

(Preparation of Titanium-Silicon-Molybdenum-Closely-Mixed Oxide):

First, an titanium-silicon-molybdenum-closely-mixed oxide was prepared in the following way. An amount of 2.25 kg of a molybdic acid powder was added to a mixed solution comprising 10 kg of silica sol (Snowtex-30 with an $SiO_2$ content of 30 wt %, produced by Nissan Chemical Industries, Ltd.), 101.2 kg of industrial ammonia water ($NH_3$ content=25 wt %) and 71 liters of water to entirely dissolve the molybdic acid by enough agitation to prepare a uniform solution, to which 214 liters of a sulfuric acid solution of titanyl sulfate (produced by TAYCA Co., Ltd.; $TiO_2$ content=70 g/liter; $H_2SO_4$ content=287 g/liter) was gradually dropwise added under agitation to form a precipitate. This coprecipitate slurry was left to stand stationary for about 20 hours, and then washed enough with water, and then filtered, and then dried at 100° C. for 1 hour. The resultant dry product was calcined at 550° C. for 4 hours under air atmosphere, and then ground with a hammer mill, and then classified with a classifier to obtain a powder having an average particle diameter of 10 μm. The composition of the titanium-silicon-molybdenum-closely-mixed oxide, as prepared in this way, was $TiO_2$:$SiO_2$:$MoO_3$= 75:15:10 (weight ratio in terms of oxide).

(Addition of vanadium oxide):

A catalyst (2) was prepared by adding the vanadium oxide by the same preparation process as of Example 1 except that, in the step of adding the vanadium oxide in Example 1, the above-prepared titanium-silicon-molybdenum-closely-mixed oxide was substituted for the titanium-molybdenum-closely-mixed oxide. The composition of the resultant catalyst (2) was (titanium-silicon-molybdenum-closely-mixed oxide):$V_2O_5$=95:5 in weight ratio ($TiO_2$:$SiO_2$:$MoO_3$:$V_2O_5$= 71.25:14.25:9.5:5 in weight ratio in terms of oxide).

Figure 2:
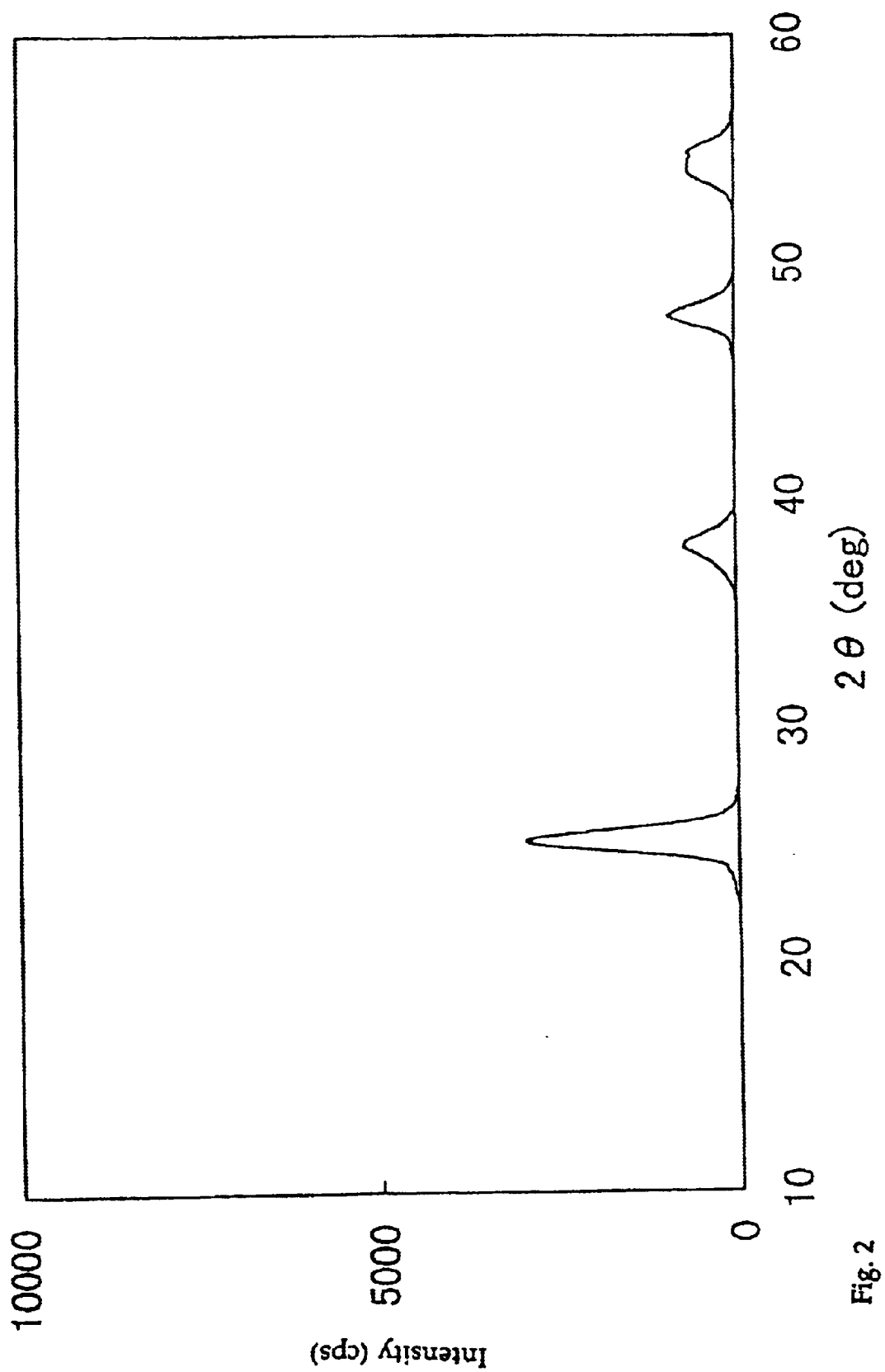
FIG. 2 is an X-ray diffraction chart of the catalyst (2) as prepared in Example 2.

An X-ray diffraction chart of the catalyst (2) is shown in FIG. 2, in which neither clear characteristic peak of $SiO_2$ nor $MoO_3$ is seen, but broad diffraction peaks of $TiO_2$ are seen. From this result, it was verified that the catalyst (2) was a trinary closely mixed oxide including titanium, silicon, and molybdenum.

EXAMPLE 3

(Preparation of Titanium-Silicon-Closely-Mixed Oxide):

A titanium-silicon-closely-mixed oxide was prepared in the following way. First, 10 kg of silica sol (Snowtex-30 with an $SiO_2$ content of 30 wt %, produced by Nissan Chemical Industries, Ltd.), 104 kg of industrial ammonia water ($NH_3$ content=25 wt %) and 73 liters of water were mixed together to prepare a uniform solution, to which 242.8 liters of a sulfuric acid solution of titanyl sulfate (produced by TAYCA Co., Ltd.; $TiO_2$ content=70 g/liter; $H_2SO_4$ content=287 g/liter) was gradually dropwise added under agitation to form a precipitate. This coprecipitate slurry was left to stand stationary for about 20 hours, and then washed enough with water, and then filtrated, and then dried at 100° C. for 1 hour. The resultant dry product was calcined at 550° C. for 4 hours under air atmosphere, and then ground with a hammer mill, and then classified with a classifier to obtain a powder having an average particle diameter of 10 μm. The composition of the titanium-silicon-closely-mixed oxide, as prepared in this way, was $TiO_2$:$SiO_2$=85:15 (weight ratio in terms of oxide). In X-ray diffraction of the titanium-silicon-closely-mixed oxide, broad diffraction peaks of $TiO_2$ were merely seen, and no clear characteristic peak of $SiO_2$ was seen.

(Addition of vanadium oxide):

A catalyst (3) was prepared by adding the vanadium oxide by the same preparation process as of Example 1 except that, in the step of adding the vanadium oxide in Example 1, a mixture of 9.5 kg of the titanium-molybdenum-closely-mixed oxide (as used in Example 1) and 9.5 kg of the above-prepared titanium-silicon-closely-mixed oxide was substituted for 19 kg of the titanium-molybdenum-closely-mixed oxide. The composition of the resultant catalyst (3) was (titanium-molybdenum-closely-mixed oxide): (titanium-silicon-closely-mixed oxide):$V_2O_5$=47.5:47.5:5 in weight ratio ($TiO_2$:$SiO_2$:$MoO_3$:$V_2O_5$=83.1:7.1:4.8:5 in weight ratio in terms of oxide).

EXAMPLE 4

A catalyst (4) was prepared by adding the vanadium oxide by the same preparation process as of Example 3 except that, in the step of adding the vanadium oxide in Example 3, the titanium-silicon-molybdenum-closely-mixed oxide (as used in Example 2) was substituted for the titanium-molybdenum-closely-mixed oxide (as used in Example 1). The composition of the resultant catalyst (4) was (titanium-silicon-molybdenum-closely-mixed oxide):(titanium-silicon-closely-mixed oxide):$V_2O_5$=47.5:47.5:5 in weight ratio ($TiO_2$:$SiO_2$:$MoO_3$:$V_2O_5$=76:14.25:4.75:5 in weight ratio in terms of oxide).

EXAMPLE 5

A catalyst (5) was prepared in the same way as of Example 4 except that, in the step of adding the vanadium oxide in Example 4, a commercially available titanium oxide powder (DT-51 (trade name), produced by Millennium Inorganic Chemicals Limited) was substituted for the titanium-silicon-closely-mixed oxide (as used in Example 3). The composition of the resultant catalyst (5) was (titanium-silicon-molybdenum-closely-mixed oxide): (titanium oxide):$V_2O_5$=70:25:5 in weight ratio ($TiO_2$:$SiO_2$:$MoO_3$:$V_2O_5$=77.5:10.5:7:5 in weight ratio in terms of oxide).

COMPARATIVE EXAMPLE 1

A solution of 1.29 kg of ammonium metavanadate and 1.68 kg of oxalic acid in 5 liters of water and a solution of 2.46 kg of ammonium paramolybdate and 1.1 kg of monoethanolamine in 3 liters of water were added to 17 kg of a commercially available titanium oxide powder (DT-51 (trade name), produced by Millennium Inorganic Chemicals Limited) to mix them well. The resulting mixture was kneaded with a kneader and then molded into a honeycomb form having an external form size of 80 mm square, an opening size of 4.0 mm, a wall thickness of 1.0 mm and a length of 500 mm with an extrusion molding machine. Thereafter, the resultant form was dried at 80° C. for 1 hour and then calcined at 450° C. for 5 hours under air atmosphere to obtain a catalyst (6).

The composition of this catalyst was $TiO_2:MoO_3:V_2O_5=$ 90:10:5 (weight % in terms of oxide).

Figure 3:
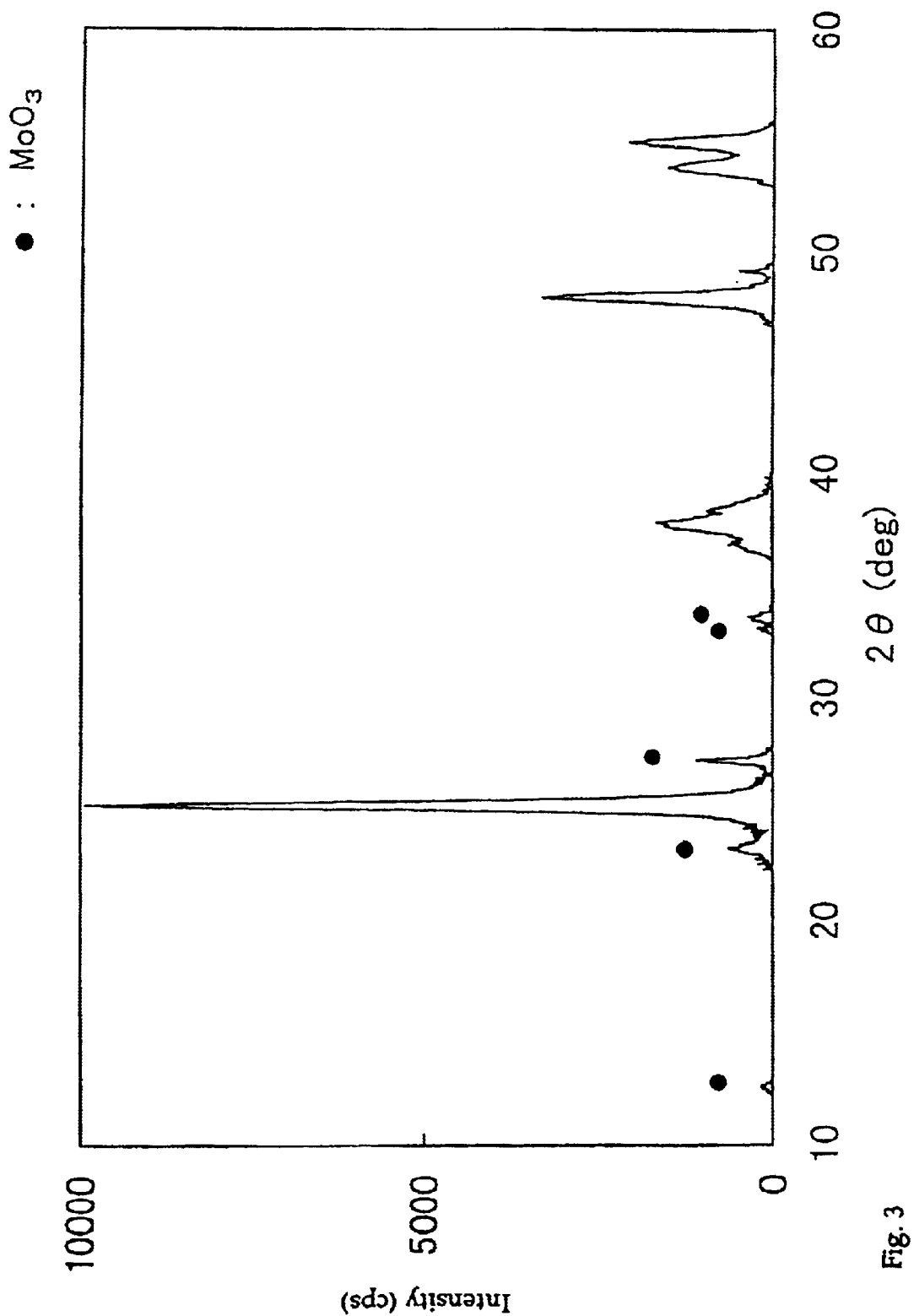
FIG. 3 is an X-ray diffraction chart of the catalyst (6) as prepared in Comparative Example 1.

An X-ray diffraction chart of the catalyst (6) is shown in FIG. 3, in which a clear characteristic peak of $MoO_3$ is seen. From this result, it was verified that the catalyst (6) was not a binary closely mixed oxide including titanium and molybdenum.

COMPARATIVE EXAMPLE 2

A catalyst (7) was prepared in the same way as of Comparative Example 1 except that the titanium-silicon-closely-mixed oxide as prepared in Example 3 was substituted for the commercially available titanium oxide powder.

The composition of this catalyst was $TiO_2:SiO_2:MoO_3:V_2O_5=72.25:12.75:10:5$ (weight % in terms of oxide).

EXAMPLE 6

The denitrifiability test and the $SO_2$ oxidation ratio measurement were carried out under the below-mentioned conditions with the catalysts (1) to (7) as obtained in Examples 1 to 5 and Comparative Examples 1 and 2.

Composition of gas being purified:
$NO_x$: 200 ppm, $SO_2$: 1,000 ppm, $NH_3$: 200 ppm, $O_2$: 10%, $H_2O$: 15%, $N_2$: Balance
Gas temperature: 250° C.
Space velocity: 10,000 $Hr^{-1}$ Incidentally, the denitrification ratio and the $SO_2$ oxidation ratio were determined in accordance with the following equations:

Denitrification ratio (%)={($NO_x$ concentration at inlet of reactor)−($NO_x$ concentration at outlet of reactor)}÷($NO_x$ concentration at inlet of reactor)×100

$SO_2$ oxidation ratio (%)=($SO_3$ concentration at outlet of reactor)÷($SO_2$ concentration at inlet of reactor)×100

The resultant denitrification ratio and $SO_2$ oxidation ratio are shown in Table 1.

TABLE 1

| | | | Denitrification ratio (%) | $SO_2$ oxidation ratio (%) |
|---|---|---|---|---|
| Example 1 | Catalyst (1) | $TM/V_2O_5$ | 97.3 | 0.4 |
| Example 2 | Catalyst (2) | $TSM/V_2O_5$ | 97.6 | 0.2 |
| Example 3 | Catalyst (3) | $TM/TS/V_2O_5$ | 96.8 | 0.3 |
| Example 4 | Catalyst (4) | $TSM/TS/V_2O_5$ | 97.1 | 0.2 |

TABLE 1-continued

| | | | Denitrification ratio (%) | $SO_2$ oxidation ratio (%) |
|---|---|---|---|---|
| Example 5 | Catalyst (5) | $TSM/TiO_2/V_2O_5$ | 97.1 | 0.3 |
| Comparative Example 1 | Catalyst (6) | $TiO_2/MoO_3/V_2O_5$ | 90.9 | 1.2 |
| Comparative Example 2 | Catalyst (7) | $TS/MoO_3/V_2O_5$ | 88.8 | 0.3 |

TM: titanium-molybdenum-closely-mixed oxide
TSM: titanium-silicon-molybdenum-closely-mixed oxide
TS: titanium-silicon-closely-mixed oxide

EXAMPLE 7

The denitrifiability test and the $SO_2$ oxidation ratio measurement were carried out in the same way as of Example 6 except that the catalysts (1) and (2) as obtained in Examples 1 and 2 were used and that the gas temperature was changed into the range of 150 to 400° C.

The resultant denitrification ratio and $SO_2$ oxidation ratio are shown in Table 2.

TABLE 2

| | Catalyst (1) | | Catalyst (2) | |
|---|---|---|---|---|
| Gas temperature (° C.) | Denitrification ratio (%) | $SO_2$ oxidation ratio (%) | Denitrification ratio (%) | $SO_2$ oxidation ratio (%) |
| 150 | 64.6 | 0.2 | 65.5 | 0.1 |
| 200 | 91.7 | 0.3 | 92.3 | 0.2 |
| 300 | 98.4 | 0.5 | 98.6 | 0.3 |
| 400 | 97.7 | 1.5 | 97.9 | 1.0 |

EXAMPLE 8

The organochlorine compound decomposition test was carried out with the catalysts (1) to (7) as prepared in Examples 1 to 5 and Comparative Examples 1 and 2. The reaction was carried out under the below-mentioned conditions using chlorotoluene (hereinafter abbreviated to "CT") as the organochlorine compound being purified.

Composition of gas being purified:
CT: 30 ppm, $O_2$: 10%, $H_2O$: 15%, $N_2$: Balance
Gas temperature: 160° C.
Space velocity (SV): 1,600 $Hr^{-1}$ Incidentally, the CT decomposition ratio, that is, CT removal ratio, was determined in accordance with the following equation:

CT decomposition ratio (%)={(CT concentration at inlet of reactor)−(CT concentration at outlet of reactor)}/(CT concentration at inlet of reactor)×100

The resultant CT decomposition ratio is shown in Table 3.

TABLE 3

| | | | CT decomposition ratio (%) |
|---|---|---|---|
| Example 1 | Catalyst (1) | $TM/V_2O_5$ | 92.0 |
| Example 2 | Catalyst (2) | $TSM/V_2O_5$ | 92.3 |
| Example 3 | Catalyst (3) | $TM/TS/V_2O_5$ | 90.9 |

TABLE 3-continued

|  |  |  | CT decomposition ratio (%) |
|---|---|---|---|
| Example 4 | Catalyst (4) | TSM/TS/V$_2$O$_5$ | 90.9 |
| Example 5 | Catalyst (5) | TSM/TiO$_2$/V$_2$O$_5$ | 92.0 |
| Comparative Example 1 | Catalyst (6) | TiO$_2$/MoO$_3$/V$_2$O$_5$ | 86.5 |
| Comparative Example 2 | Catalyst (7) | TS/MoO$_3$/V$_2$O$_5$ | 72.2 |

TM: titanium-molybdenum-closely-mixed oxide
TSM: titanium-silicon-molybdenum-closely-mixed oxide
TS: titanium-silicon-closely-mixed oxide Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A catalyst for purification of exhaust gases, which comprises titanium oxide, silicon oxide, molybdenum oxide, and vanadium oxide as catalytic components, wherein the titanium oxide and the molybdenum oxide are included in the catalyst in the form of a ternary closely mixed oxide which is beforehand prepared and includes titanium, silicon, and molybdenum.

2. A catalyst for purification of exhaust gases according to claim 1, which is a denitrification catalyst.

3. A process for purification of exhaust gases, which comprises the step of bringing the exhaust gases into contact with the catalyst as recited in claim 2.

4. A catalyst for purification of exhaust gases according to claim 1, which is a catalyst for removing organohalogen compounds.

5. A process for purification of exhaust gases, which comprises the step of bringing the exhaust gases into contact with the catalyst as recited in claim 4.

6. A process for purification of exhaust gases, which comprises the step of bringing the exhaust gases into contact with the catalyst as recited in claim 1.

7. A production process for a catalyst for purification of exhaust gases wherein the catalyst comprises titanium oxide, silicon oxide, molybdenum oxide, and vanadium oxide as catalytic components, with the production process comprising the steps of: mixing a titanium-containing compound aqueous solution or slurry with a molybdenum compound and a silicon compound; and then removing water which is included in said solution or slurry.

* * * * *